United States Patent [19]

Fung

[11] Patent Number: 4,472,514

[45] Date of Patent: * Sep. 18, 1984

[54] PROCESS FOR REACTIVATING IRIDIUM-CONTAINING CATALYSTS IN SERIES

[75] Inventor: Shun C. Fung, Bridgewater, N.J.

[73] Assignee: Exxon Research and Engineering Co., Florham Park, N.J.

[*] Notice: The portion of the term of this patent subsequent to Sep. 18, 2011 has been disclaimed.

[21] Appl. No.: 375,229

[22] Filed: May 5, 1982

[51] Int. Cl.$^3$ .................... B01J 23/96; C10G 35/09; C10G 35/085

[52] U.S. Cl. .................... 502/37; 208/140; 502/36

[58] Field of Search ................ 252/415, 441; 208/140; 502/35–37, 230

[56] References Cited

U.S. PATENT DOCUMENTS

| | | |
|---|---|---|
| 3,622,520 | 11/1971 | Hayes . |
| 3,625,860 | 12/1971 | Condrasky . |
| 3,904,510 | 9/1975 | Sinfelt et al. . |
| 3,937,600 | 2/1976 | Yates et al. . |
| 3,939,061 | 2/1976 | Paynter et al. . |
| 3,939,062 | 2/1976 | Sinfelt et al. . |
| 3,941,682 | 3/1976 | Kmak et al. . |
| 3,941,716 | 3/1976 | Paynter . |
| 3,943,052 | 3/1976 | Kmak et al. . |
| 3,981,823 | 9/1921 | Yates . |
| 3,998,755 | 12/1976 | Hayes ................... 252/415 |
| 4,046,673 | 9/1977 | Paynter et al. . |
| 4,159,938 | 7/1979 | Lewis . |
| 4,172,817 | 10/1979 | Yates et al. . |
| 4,359,400 | 11/1982 | Landoct et al. ........... 252/441 |

FOREIGN PATENT DOCUMENTS

| | | |
|---|---|---|
| 0057551 | 11/1982 | European Pat. Off. . |
| 2257337 | 8/1975 | France . |
| 2290953 | 11/1975 | France . |
| 1484372 | 9/1977 | United Kingdom . |
| 1516518 | 7/1978 | United Kingdom . |

*Primary Examiner*—P. E. Konopka
*Attorney, Agent, or Firm*—Robert J. North; Edward H. Mazer

[57] ABSTRACT

A process is disclosed for reactivating agglomerated iridium-containing catalysts, in series, and particularly platinum-iridium on alumina reforming catalysts. The process includes a reducing step, involving contacting a decoked agglomerated catalyst with a reducing gas, such as hydrogen, to reduce agglomerated iridium oxides to the free metal, a halide pretreatment step to increase the halide level of the catalyst to about 1.3 weight percent and above, a halogen/water vapor redispersion step at elevated temperature and a contacting of a second catalyst, in series, with the halogen/water vapor effluent at elevated temperature to partially burn-off the carbon deposits on the catalyst surface. Utilizing the effluent halogen stream, rather than subjecting to a scrubbing operation represents a savings in process costs, minimizes pollution problems and provides additional halogen protection to subsequent catalyst reactors in the process scheme.

15 Claims, No Drawings

PROCESS FOR REACTIVATING IRIDIUM-CONTAINING CATALYSTS IN SERIES

BACKGROUND OF THE INVENTION

This invention relates to a process for reactivating agglomerated iridium-containing catalysts in series, involving the sequential steps of decoking a first catalyst to remove carbon desposits, reducing agglomerated iridium oxides formed during decoking on the catalyst surface to the free metal, pretreating the catalyst surface with a halide-providing compound in the absence of elemental oxygen, redispersing the iridium metal by contacting with elemental halogen in admixture with water vapor at elevated temperature and contacting a second catalyst, in series, with the effluent chlorine/water at elevated temperature to partially remove carbon deposits prior to a redispersion step.

SUMMARY OF THE INVENTION

It has been found the iridium-containing catalysts, in series, can be efficiently and effectively redispersed and reactivated by the use of a reduction step followed by a halide pretreatment prior to an elemental halogen redispersion step. The redispersion step is conducted with a mixture of elemental halogen and water vapor in order to complete the decoking of the catalyst surface. The effluent chlorine/water is then delivered to a second spent catalyst, in series, to initiate a second redispersion cycle.

The halide pretreatment step is conducted with two limitations, (1) that above about 1.3 weight percent halide, and preferably 1.4 to 2.5 weight percent halide, taken as the coke-free, dry catalyst, and most preferably saturated with halide under the conditions used, is present on the catalyst surface after the pretreatment and maintained at, or above this level up to, and during the subsequent halogen redispersion step, and (2) that during the halide pretreatment step, no elemental oxygen is present in the feedstream or is generated, in situ. If this halide level is not maintained during subsequent redispersion and if elemental oxygen is present during the pretreatment, then substantially lower redispersion values will be obtained with concomitant decrease in catalyst metal surface area and activity.

The subject process is applicable to a wide variety of iridium-containing catalysts and particularly to reforming catalysts employing platinum-iridium on alumina which are completely or partially decoked. Generally, halide-providing compounds are used in the pretreatment step, including organic halides and hydrogen halides with gaseous hydrogen chloride being the preferred hydrogen halide-providing compound used in the pretreatment and chloride levels of about 1.3 weight percent and above of catalyst, on the catalyst surface, are necessary to insure effective redispersion. In the case of commercial used catalysts having lower surface areas because of use, the surface halide requirement will be slightly lower. The halide weight percent is expressed on the basis of dry, coke-free catalyst.

The pretreatment step is generally conducted in the temperature range of about 300° to 600° C., and the halide weight percentage can be monitored, for example, by X-ray fluorescence versus known standards. Generally, with the exception of very severely coked and agglomerated iridium-containing catalyst, the subject process is capable of producing substantially decoked, highly redispersed, iridium-containing catalyst in a one-cycle treatment.

In accordance with this invention, there is provided a process for reactivating partially or completely decoked agglomerated iridium-containing catalysts, in series, comprising the steps of:

(a) reducing a first said catalyst by contact with a reducing atmosphere at elevated temperature for a sufficient time to substantially convert iridium value to metallic iridium;

(b) pretreating said catalyst from step (a) by contact with an elemental oxygen-free atmosphere comprising a halide-providing compound at elevated temperature for a sufficient time to provide the catalyst with about 1.3 weight percent and above halide, taken as the coke-free, dry material;

(c) redispersing the iridium metal from step (b) by contact with an atmosphere comprising elemental halogen and water vapor at a temperature of about 480° C. and above, for a time sufficient to substantially complete decoking and to substantially redisperse metallic iridium;

(d) contacting a second said catalyst, in series, with the effluent halogen/water vapor atmosphere from step (c) to partially decoke said second catalyst.

DESCRIPTION OF THE INVENTION AND PREFERRED EMBODIMENTS

Catalysts which can be treated by the subject process as described above, include generally, iridium-containing catalysts, with and without co-catalysts, preferably being supported. Other metallic co-catalysts, with iridium, which are applicable in the process, include metals such as, for example, platinum, rhodium, rhenium, palladium, mixtures thereof and the like. The metals can be present in bimetallic, trimetallic combinations and higher combinations as alloys, or physical mixtures, on the same support particles or where the metals are individually present on separate support particles. Preferred metal combinations in the catalyst for treatment by the subject process are platinum-iridium and platinum-iridium-rhenium.

The metals can be supported on a suitable support, which is conventional, with the proviso that the support is stable during the pretreatment process and does not undergo any deleterious reactions. Representative examples include silica, zeolites, alumina, silica-alumina, zirconia, alumina-zirconia, mixtures thereof and the like. In general, the active metallic components, if supported, are present in an amount of preferably up to about 10 weight percent of the supported catalysts.

A preferred catalyst which can be reactivated in the process is agglomerated platinum-iridium, preferably supported on alumina.

By the term, "agglomerated catalysts", as used herein, is meant a supported or unsupported catalyst containing metallic iridium singly, or in combination with other metals described herein, in the agglomerated state, sufficient to reduce the catalytic activity of the metal catalyst. The agglomerated metal, e.g., metallic iridium, can be present due to the result of oxygen burn-off of coke deposits producing agglomerated iridium oxide which then must be reduced to metallic iridium by hydrogen gas. Also, hydrogen stripping at high temperature, preferably about 450° to 600° C., will result in partial removal of coke deposits and leave the agglomerated iridium in a metallic state. The metallic iridium in the agglomerated catalyst will undergo effective redispersion by the process described herein. Where the catalyst additionally contains iridium oxide, a hydrogen reducing step is necessary to convert the iridium oxide to metallic iridium prior to redispersion.

The agglomerated metallic iridium-containing catalysts operable in the process can be completely or partially decoked as described above by separate oxygen or hydrogen treat steps or not decoked at all, but simply removed from an on-stream process, e.g., reforming in the presence of hydrogen gas at elevated temperature and subjected to the described process herein.

Agglomerated, catalysts which can be treated by the subject process are usually industrially decoked by an oxygen burn-off of carbon deposits. Generally, a typical used catalyst from industrial operation may contain up to about 6 weight percent of carbon deposits and may be agglomerated after the decoking step up to about a 100 percent extent, as evidenced by X-ray diffraction. Generally, depending on the conditions used in the coke burn, carbon deposits remaining may be present in about 0.05 to 1.0 weight percent of the catalyst, taken as the dry catalyst. In general, the agglomerates are greater than about 50 Å and up to about 100 Å and greater in crystallite size. Decoking of the catalyst can be conducted by heating in an atmosphere containing 0.01 to 10 volume percent $O_2$ at a temperature of about 400° to 500° C., to remove surface and embedded carbon deposits and particularly, "active" carbon deposits which can react with halogen during the redispersion step to form halogenated species which are not readily removed from the catalyst surface. Generally, about 60 to 100 weight percent of carbon deposits can be removed in the decoking step. For example, U.S. Pat. No. 3,904,510 discloses a typical procedure employed in decoking. The subject process is applicable to a wide range of decoked agglomerated catalysts containing varying amounts of remaining carbon deposits, different degrees of agglomeration, varying particle size ranges and varying impurities.

The first step in the subject process is wherein said partially or completely decoked agglomerated catalyst in the first reactor is treated with a reducing atmosphere, generally comprising hydrogen gas, to reduce primarily metal oxides formed during decoking and as a further aid in removing residual active carbon deposits from the decoking step. Other reducing or inert gases may also be present, including nitrogen, helium and the like. The reducing step is generally conducted by contacting the catalyst at an elevated temperature, generally in the range of about 250° to 600° C., preferably about 300° to 540° C. in a reducing atmosphere comprising above about one volume percent hydrogen gas or above for a time to substantially reduce metal oxides present to the free metal, as evidenced by the absence of metal oxide lines and the appearance of iridium metal lines in the X-ray diffraction pattern. Larger and smaller volume percentages of hydrogen can also be effectively used.

X-ray diffraction patterns taken on fresh iridium-containing catalysts show no lines corresponding to any metal component, which indicates that the metal components are present in very small particle sizes, less than about 50 Å. X-ray diffraction patterns, as taken on the same catalysts used in reforming, from which coke has been burned in numerous cycles of use, show distinct metal lines which indicate highly agglomerated metal particles of about 10 to 100 weight percent agglomeration of crystallites of about 100 Å and greater. Thus, X-ray diffraction is a useful and convenient technique for measuring the extent of agglomeration, reduction and redispersion of the catalyst in the subject process.

Preferred conditions in the reducing step are the use of hydrogen as the reducing gas in a reducing atmosphere comprising essentially hydrogen, at a volume concentration of 0.05 to 5 volume percent, and a pressure of about 0.1 to 2.0 MPa, and an inert gas carrier such as nitrogen or helium, particularly preferred at a temperature of about 300° to 540° C. for a time sufficient to achieve a substantial reduction of the iridium oxide and other metal oxide to the free metals. By the term "substantially reduce" is meant a reduction in the numerical amount of iridium oxides present by about 75 to 100 percent and preferably about 90 to 100 percent. Generally, time requirements for the reduction will be in the range from about one to several hours, depending on the process conditions. Shorter and longer times are also applicable.

Following the reduction step, the decoked-reduced catalyst is then subjected to a redispersion-pretreatment step with a halide-providing compound and by the term is meant a compound containing ionically or covalently bound halogen which, under the process conditions, can release the halogen in halide form, preferably as hydrogen chloride, to the catalyst surface. Representative examples include haloorgano compounds and preferably hydrogen halides. Haloorgano compounds include chlorocarbons such as carbon tetrachloride, methylene chloride, chloroform, methyl chloride, 1,2-dichloroethane, hexachloroethane, mixtures thereof and the like. When using haloorgano compounds, hydrogen must in a large excess over the stoichiometric amount also be used to convert the haloorgano compound to a hydrogen halide. The hydrogen halides can be hydrogen fluoride, hydrogen chloride, hydrogen bromide, or hydrogen iodide. Preferably, hydrogen chloride is the halide-providing compound used in the process. The atmosphere contacting the catalyst in this step can contain other inert gases, e.g., nitrogen and the like, and also including water vapor for more uniform distribution of halide on the catalyst surface prior to the halogenation treatment, and also hydrogen gas or reducing gas to insure that the reducing catalyst remains in the reduced state during hydrogen halide pretreatment. It is essential that the atmosphere be substantially elemental oxygen-free during the halide pretreatment. Within this context, the halide feedstream should also preferably be elemental halogen-free since it is believed that elemental halogen reacts with surface hydroxyl groups to generate elemental oxygen. However, if chlorine is an impurity in the pretreating step gaseous mixture, then a small amount of hydrogen gas should be added to insure the absence of elemental oxygen.

The temperature of the halide pretreatment is generally conducted in the range of about 250° to 600° C. and preferably about 300° to 540° C., and the halide-providing compound, at the above-identified temperature, is contacted with the catalyst in a gaseous stream until about 1.3 weight percent and above halide is provided to the catalyst as detected, for example, by X-ray fluorescence. Preferably, the catalyst is pretreated to a range of about 1.4 to 2.5 weight percent halide, or higher, and most preferably, up to saturation by halide of the catalyst surface. As described hereinabove, the weight percentage of halide provided to the catalyst is taken on a dry and coke-free catalyst basis. Where the catalyst is commercial and extensively used in commercial processes having a lower surface area and catalytic activity as a result of this continued use, a minimum weight percentage of about one percent halide is reasonably believed to be effective in promoting high redispersion values in the subject process. For example, fresh catalysts having BET surface areas of 180 m²/g and higher will require 1.3 weight percent halide and above. Used catalysts having surface areas of about 100 to 180 m²/g will generally only require a minimum of 1 to 1.3 weight percent halide prior to redispersion. However, an exact minimum value cannot be stated for a commercial spent catalyst due to large variances in surface area, coke deposits, impurities and poisons present, and the like. One skilled in the art, however, will be able to utilize this disclosure successfully for efficient redispersion. It is important that the halide content be maintained up to the halogen redispersion treatment. If a "purge" of hydrogen, nitrogen, water, mixtures thereof, or other materials is used subsequent to the halide pretreatment, then such purge or contacting step should not reduce the halide level to below about 1.3 weight percent. If this happens, then the halide pretreatment should again be conducted to insure a minimum of about 1.3 weight percent or above halide being present. This is particularly true in cases where multicycle treatment may be necessary in which the weight percent of halide present on the catalyst must be replenished again to about 1.3 weight percent and above prior to each halogen redispersion treatment.

The halide pretreatment is conducted for sufficient time to achieve a halide loading, as described above. In practice, a fast flowing stream of preferably hydrogen chloride is contacted with the catalyst up to, and slightly beyond breakthrough. By the term "breakthrough" is meant the first visible detection by an analytical method such as, for example, the color change of an acid-base indicator, e.g., phenolphthalein.

Halide pretreatment is conducted to breakthrough to achieve desired halide loading of the catalyst and also to insure a uniform distribution of halide over the entire length of the catalyst bed to prevent "halide gradients" which can lead to non-uniform redispersion. In general, water vapor present in the halide feedstream will tend to lower the halide loading slightly below that compared to a dry halide application, by approximately about 0.4 weight percent, but generally results in a more uniform halide distribution. Thus, saturation by dry HCl of a coke-free, dry catalyst will result in up to about a 2.8 weight percent halide loading, whereas saturation with a wet stream of HCl will result in up to about 2.4 weight percent, or even slightly lower, halide loading.

Time required for the halide pretreatment will, of course, be dependent on many factors including flow rate, hydrogen halide gaseous concentrations, amount of catalyst and can be desirably adjusted, for example, to run for about 1 to 3 hours per catalyst regeneration in general. Concentration of hydrogen halide can be from 0.05 to about 5 volume percent or higher in the feedstream, which can be at a total pressure of about 0.1 to 2.0 MPa. Higher and lower values of both variables can also be used effectively.

Following the halide pretreatment step, the decoked, reduced catalyst is then subjected to a halogen redispersion step by contacting the catalyst with a stream comprising a mixture of elemental halogen gas and water at an elevated temperature. Elemental halogen gases applicable are fluorine, chlorine, bromine and iodine with chlorine being a preferred embodiment.

The halogen/water redispersion step is generally carried out at a temperature of about 480° to 600° C. and preferably about 500° to 540° C. The elemental halogen and water are present in the redispersion feedstream in a halogen/water volume ratio of about 0.2 to 5 and preferably 0.5 to 2 at elevated temperature, the water vapor is generally present as steam.

The gaseous halogen atmosphere also contains inert gases such as nitrogen or helium as carrier gases.

The presence of water vapor serves as an aid in removing small quantities of carbon deposits which remain after the initial decoking step.

The halogen/water redispersion step is generally conducted past the breakthough point, as evidenced or detected, for example, by a starch-iodide indicator. Generally, this requires about 0.5 to 2 hours of treatment for spent catalyst, which depends upon flow rate, halogen and water concentrations in the feedstream and amount of catalyst. Generally, however, slightly longer times of halogen treatment are required for substantially complete redispersion, as evidenced by the absence of crystalline metal or metal oxide lines in the X-ray diffraction patterns. Preferably, a time of about 30 to 90 minutes past breakthrough, i.e., substantially past breakthrough, is necessary for substantially complete redispersion assuming a halogen/water flow rate of about 1.1 grams chlorine per 100 grams catalyst per hour and above.

The effluent halogen/water stream at elevated temperature from the first catalyst reactor is directed into a subsequent reactor chamber containing a second catalyst, in series, as described herein. A sufficient amount of chlorine/water effluent is contacted with the second catalyst to provide about 1.3 weight percent and higher chloride to the catalyst prior to the coke burn. This acts as an aid in inhibiting metal agglomeration during the oxygen-atmosphere coke-burn, and functions as a means of reducing the amount of hydrogen chloride needed in the pretreatment step. It also serves as a means for partially decoking the catalyst surface prior to the coke burn.

The temperature of the second catalyst during contacting with the halogen/water treatment is about 480° to 540° C.

By carrying out the process described herein, substantially complete redispersion of iridium-containing catalyst is capable of being achieved and particularly the catalysts of platinum-iridium on alumina used in hydrocarbon reforming operations. In the latter case, 75 to 100 percent redispersion of both the platinum and iridium agglomerated metals is capable of being achieved in the process.

By the term "substantially complete redispersion" as used herein, is meant redispersion values, as determined by X-ray diffraction, of greater than about 55 numerical percent and preferably about 75 to 100 numerical percent of the iridium on the catalyst surface, also including other metals when present.

Apparatus useful for carrying out the subject process will be conventional in the art and whether operating on a laboratory scale, pilot plant or full commercial plant scale, the apparatus will be obvious to one skilled in the art.

In practice, following successful redispersion of iridium on the catalyst surface, a reduction of halide to about 1.0 weight percent is carried out prior to the actual reforming process since excess halide, at this stage, leads to cracking of the liquid hydrocarbon fraction to undesirably smaller hydrocarbon fragments. This downgrading can be accomplished by a wet hydrogen stream, for example, which also serves to convert all of the metal species present after redispersion to the metallic state prior to use in a reforming process.

The following examples are illustrative of the best mode of carrying out the instant invention, as contemplated by us, and should not be construed as being limitations on the scope or spirit of the instant invention.

EXAMPLE 1

A quartz, tubular, horizontal reactor was charged with about 60 grams of an agglomerated, coke-free platinum-iridium catalyst wherein 100 percent of the iridium was agglomerated. It contained 0.3 weight percent iridium and 0.3 weight percent platinum based on the total weight of the catalyst. The catalyst was divided into three approximately equal sections with a quartz wool plug as a spacer between the sections. The catalyst in Section 1 was at the entry of the reactor and the catalyst in Section 3 was at the reactor exit. The chloride level on this catalyst was determined to be 0.67 weight percent.

The catalyst was treated with a gas mixture of 20 percent hydrogen in helium at one atmosphere for 2 hours at 524° C. At the end of hydrogen treat, a gaseous mixture of 1 volume percent hydrogen chloride and 1.4 volume percent water in helium was allowed to contact the catalyst up to a point at which the concentration of hydrogen chloride in the exit gas equaled that in the inlet. At this point, chlorine was added to the gas stream at 0.83 volume percent and at a mass flow rate of 0.29 grams per 100 grams of catalyst per hour. Chlorine was detected at the reactor exit at a chlorine treat equaled to 0.27 grams chlorine per 100 grams of catalyst. Chlorine injection was extended beyond the point of detection until 0.74 grams chlorine per 100 grams of catalyst had been introduced into the reactor. The results are given in the Table.

Excellent metal redispersion is obtained when the chlorine treat is continued beyond the point of chlorine detection. The amount of chlorine injected beyond the point of detection was 0.47 grams per 100 grams of catalyst. The downstream equipment would be contacted with this amount of chlorine if there was no provision for its removal.

EXAMPLE 2

Catalyst of Example 1 was mixed with carbon black powder to give a carbon content of 0.37 weight percent based on anhydrous catalyst. The catalyst was treated exactly as in Example 1 except that the mass flow rate of chlorine was 0.36 grams per 100 grams of catalyst per hour. No chlorine was detected at the reactor exit after the catalyst had been in contact with 2.35 grams halogen per 100 grams of catalyst. The results are given in the Table below.

The data indicated that when the catalyst contained 0.37 weight percent coke deposits, the chlorine front traveled from the catalyst bed entrance to about 40 percent of the total bed length at a chlorine treat equaled to 2.35 grams chlorine per 100 grams catalyst. Coke deposits on this portion of the catalyst were nearly quantitatively removed. Therefore, if catalyst in Example 2 was downstream of catalyst in Example 1, i.e., the two reactors were in series and the carbon-containing catalyst was at the back reactor, no chlorine would be detected in the exit gas of the back reactor and, in fact, it can easily be calculated that less than 10 percent of the carbon-containing catalyst is needed to react with the 0.47 grams chlorine per 100 grams catalyst emerging from the exit of the front reactor.

EXAMPLE 3

An alumina catalyst containing 0.3 weight percent iridium and 0.3 weight percent platinum, based on the total weight of the catalyst, was used in a reformer in the production of $C_5+$ gasoline. Several weight percent of coke deposit was found on the catalyst. The catalyst was regenerated in the reactor with dilute oxygen at a flame front temperature of about 400° C. The resulting iridium agglomeration was 49 percent and the carbon content in the regenerated catalyst was 0.62 weight percent. Sixty grams of this catalyst was charged into the reactor and the reactivation procedure used was substantially the same as in Example 2 except that no water was present in the treating gases and the mass flow rate of the chlorine treatment was 2 grams per 100 grams catalyst per hour. The results are given below in the Table.

This example indicates that coke deposits were not quantitatively removed by the dry chlorine treatment since the carbon deposits in the three sections were quite uniform. Indeed, for this particular catalyst, about 0.3 weight percent of coke deposits was the maximum amount that could be removed by the dry chlorine treatment since the more than 2.5 times longer chlorine exposure of catalyst in Section (1), as compared to Section (3), did not significantly increase the carbon removal of the former.

TABLE

| Example | % Ir Agglom. TI[a] | S-1 | S-2 | S-3 | % Redis. S-1 | S-2 | S-3 | % Cl I | S-1 | S-2 | S-3 | % C I | S-1 | S-2 | S-3 |
|---|---|---|---|---|---|---|---|---|---|---|---|---|---|---|---|
| 1[b] | 100 | 0 | 0 | 10 | 100 | 100 | 90 | 0.67 | 1.79 | 1.90 | 1.90 | — | — | — | — |
| 2[c] | 100 | 0 | 100 | 100 | 100 | 0 | 0 | 0.67 | 2.0 | 2.7 | 2.6 | 0.37 | 0.05 | 0.36 | 0.37 |
| 3[d] | 49 | 6 | 7 | 34 | 88 | 86 | 31 | 0.78 | 3.3 | 3.3 | 3.3 | 0.62 | 0.31 | 0.32 | 0.36 |

[a]Total initial iridium agglomeration.
[b]Chlorine mass flow rate (g/100 g cat./hr.): 0.29; Amount of Cl₂ used until detection (g/100 g cat.): 0.27; Amount Cl₂ used beyond detection: 0.47.
[c]Chlorine mass flow rate (g/100 g cat./hr.): 0.36; no chlorine was detected at reactor exit at end of run; Amount of Cl₂ used at end of run (g/100 g cat.), 2.35.
[d]Chlorine mass flow rate (g/100 g cat./hr.): 2.0; Amount of Cl₂ used until detection (g/100 g cat.): 3.1; Amount Cl₂ used beyond detection: 2.0.

What is claimed is:

1. A process for reactivating coked iridium-containing catalysts, in series, comprising the steps of:
   (a) decoking a first said catalyst to recover decoked agglomerated iridium-containing catalyst;
   (b) reducing said decoked catalyst from step (a) by contact with a reducing atmosphere at elevated temperature for a sufficient time to substantially convert iridium value to metallic iridium;

(c) pretreating said catalyst from (b) by contact with an elemental oxygen-free atmosphere comprising a halide-providing compound at elevated temperature for a sufficient time to provide the catalyst with about 1.3 weight percent and above halide to the catalyst, taken as the coke-free, dry catalyst;

(d) redispersing the metallic iridium from step (c), while maintaining said 1.3 weight percent halide provided to the catalysts, by contact with an atmosphere comprising elemental halogen and water vapor in a halogen/water volume ratio of about 0.2 to 5, at a temperature of about 480° C. and above for a time sufficient to substantially complete decoking and to effect a 75–100 percent redispersion of said metallic iridium on the catalyst surface; and (e) contacting a second said catalyst, in series, with the effluent halogen/water atmosphere from step (d), to partially decoke said second catalyst.

2. The process of claim 1 wherein said agglomerated iridium-containing catalyst is present on a catalyst support selected from the group consisting of silica, zeolite, alumina, silica-alumina, zirconia, zirconia-alumina, and mixtures thereof.

3. The process of claim 1 wherein said agglomerated catalyst further contains a metal co-catalyst selected from platinum, rhodium, rhenium, palladium and mixtures thereof.

4. The process of claim 1, wherein said halide-providing compound is one which provides a hydrogen halide in the presence of hydrogen gas.

5. The process of claim 4 wherein said halide-providing compound is selected from carbon tetrachloride, chloroform, methylene chloride, methyl chloride, 1,2-dichloroethane, hexachloroethane, and mixtures thereof, in the presence of hydrogen gas.

6. The process of claim 1 wherein said halide-providing compound is hydrogen chloride.

7. The process of claim 1 wherein said halide is present on the catalyst after step (c) in an amount of about 1.7 to 2.5 weight percent, taken as the coke-free dry catalyst.

8. The process of claim 1 in which the catalyst during step (c) under the process conditions is saturated with halide.

9. The process of claim 1 wherein said agglomerated catalyst is platinum-iridium supported on alumina.

10. The process of claim 1 wherein said catalyst is platinum-iridium-rhenium supported on alumina.

11. The process of claim 1 wherein said reducing atmosphere in step (b) comprises hydrogen gas.

12. The process of claim 1 wherein the temperature in steps (b) and (c) is in the range of about 250° to 600° C.

13. The process of claim 1 wherein said elemental halogen in step (d) is chlorine.

14. The process of claim 1 wherein said temperature in step (d) is in the range of about 480° to 600° C.

15. A process for reactivating coked platinum-iridium on alumina catalysts in series comprising the steps of:

(a) decoking a first said catalyst to recover decoked agglomerated platinum-iridium on alumina catalyst;

(b) contacting said decoked catalyst from step (a) with a hydrogen atmosphere at a temperature in the range of about 300° to 540° C. for a sufficient time to substantially reduce the oxides of platinum and iridium to the respective metals;

(c) contacting said catalyst from step (b) with an elemental oxygen-free atmosphere comprising hydrogen chloride at a temperature in the range of about 300° to 540° C. and a pressure of about 0.1 to 2 MPa for a sufficient time to saturate the catalyst with chloride;

(d) contacting the catalyst from step (c) while maintaining a saturated catalyst chloride level with an atmosphere comprising elemental chlorine and water vapor in a halogen/water volume ratio of about 0.5 to 2 at a temperature in the range of about 500° to 540° C. for a sufficient time to substantially remove all coke deposits and to effect about a 90 to 100 percent redispersion of metallic platinum and iridium; and, (e) contacting a second said catalyst in series with the effluent chlorine/water vapor atmosphere at elevated temperature from step (d) to partially decoke said second catalyst.

* * * * *